4454X
W. Coburn,
Wind Wheel,
Patented June 1, 1826.
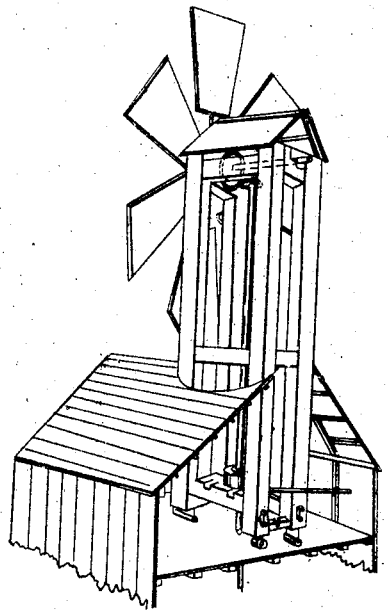
THE NORRIS PETERS CO., WASHINGTON, D. C.

MISSING PAGE TEMPORARY NOTICE

PATENT # 4454X FOR ISSUE DATE 6-1-1826 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text